Nov. 25, 1969  E. W. SCOTT  3,479,839

FREEZABLE WATER COOLING CHAMBER

Filed July 31, 1967

WITNESSES
Theodore T. Wrobel
James T. Young

INVENTOR
Eugene W. Scott
BY Edward C. Arenz
ATTORNEY

United States Patent Office 3,479,839
Patented Nov. 25, 1969

3,479,839
FREEZABLE WATER COOLING CHAMBER
Eugene W. Scott, Columbus, Ohio, assignor to Westinghouse Electric Corporation, Pittsburgh, Pa., a corporation of Pennsylvania
Filed July 31, 1967, Ser. No. 657,127
Int. Cl. B67d 5/62; F28f 13/00
U.S. Cl. 62—394                5 Claims

ABSTRACT OF THE DISCLOSURE

Drinking water cooler cooling chamber apparatus having refrigerant coils wrapped about the chamber in a non-uniform spacing concentrating the heat extracting capacity adjacent the inlet end of the chamber to cause the water within the chamber to freeze, when it does, in a controlled sequence from the inlet to the outlet end of the chamber to avoid ice bridging across the outlet with part of the interior water trapped in the interior of the chamber.

CROSS REFERENCE TO RELATED APPLICATION

Commonly-assigned, simultaneously-filed, Scott and Ter Buch U.S. patent application Ser. No. 657,126 entitled Liquid Cooling Chamber discloses structure which is in part common to the cooling chamber structure which is the subject of this application.

BACKGROUND OF THE INVENTION

Field of the invention

This invention pertains generally to the art of cooling chambers.

Description of the prior art

One typical prior art water cooling chamber which is arranged to admit the warm or incoming water supply to the top and discharge cool water from the bottom of the chamber, has uniformly spaced refrigerant coils wrapped about the chamber exterior. Rupturing of these chambers occurs readily when they freeze solidly. While drinking water coolers are obviously not intended to operate in a fashion which permits all of the water in the chamber to freeze, it occasionally happens when the temperature control system fails for one reason or another to stop the refrigeration system. The progression of freezing of the water within such a prior art chamber is generally indicated by the sequence numbers 1-5 of the diagrammatic view of FIGURE 1. The crux of the apparent difficulty in the freezing sequence illustrated in FIGURE 1 is that the bottom outlet tube is frequently frozen over and blocked before the entire quantity of water in the chamber is frozen solid. Hence, as the water in space 5 in the chamber finally freezes without adequate space for expansion, a considerable pressure is built up which frequently causes the chamber to rupture after one or only a few freezing cycles.

Thus an object of this invention is to provide a cooling chamber structure adapted to undergo numerous complete freeze-ups without ruptures occurring.

SUMMARY OF THE INVENTION

The cooling chamber structure according to the invention is provided with refrigerant coils which are non-uniformly spaced about the chamber with the closer spacing of the coils being provided near the inlet end of the chamber and the substantially wider spacing being provided toward the outlet. Also according to the invention, the inlet end of the chamber is shaped to limit the amount of water in the vicinity of the closely spaced coils to insure early freezing of that water.

The preferred chamber structure for commercial purposes has a bottom inlet and a top outlet. Thus, the air which naturally accumulates at the chamber top is eliminated directly through the top outlet without the need for the usual purge tube of prior art structures.

In summary then, the gist of the invention is the provision of a cooling chamber having a configuration relative to the capacity and location of the refrigerant coils that with a control malfunction resulting in the chamber freezing, heat is extracted from the chamber and the water frozen in a sequence which does not damage the chamber.

DRAWING DESCRIPTION

DESCRIPTION OF THE PREFERRED EMBODIMENT

Figure 1:
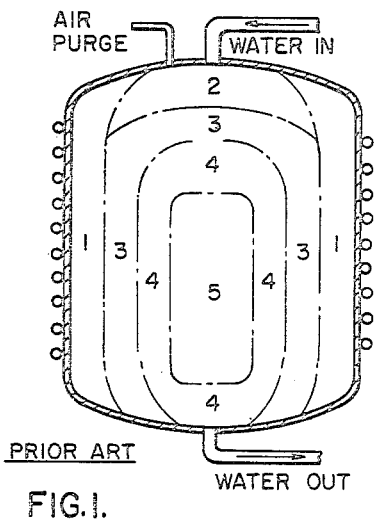
FIGURE 1 is a view in the nature of a vertical section through a prior art cooling chamber with a numerical indication of the sequence of freezing of water in such a chamber.
Figure 2:
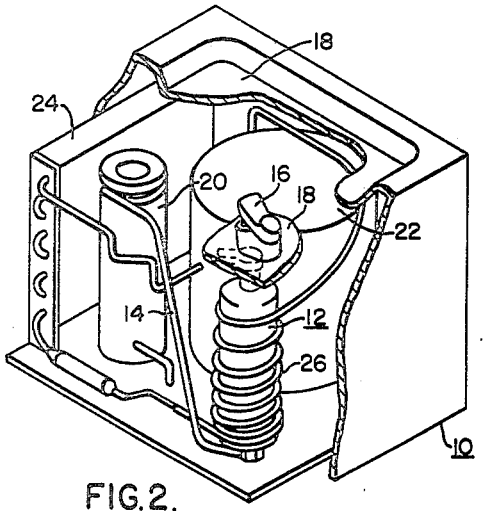
FIG. 2 is an isometric view of a water cooler having a cooling chamber according to the invention.

The drinking water cooler illustrated in FIG. 2 generally includes: a cabinet 10; a cooling chamber 12 supplied with water at the bottom through tube 14 and having a top-connected bubbler valve 16; a basin top 18 having a drain outlet (not shown) connected to the pre-cooling and insulated drain pipe 20; and a refrigeration system including a compressor 22, condenser 24, and evaporator coils 26 wrapped about the exterior of the cooling chamber 12. The chamber and coils are covered with thermal insulation (not shown) for cold retention.

Figure 3:
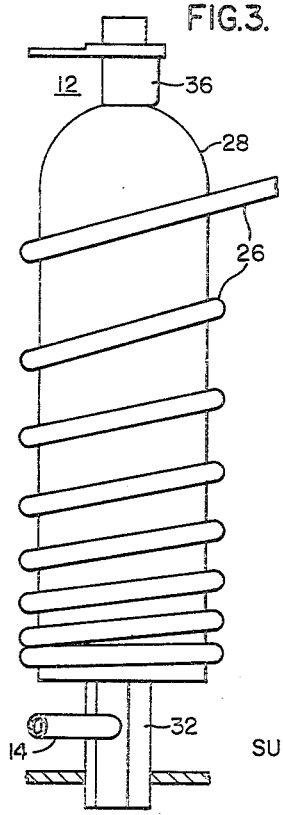
FIG. 3 is an elevational view of a cooling chamber according to the present invention.
Figure 4:
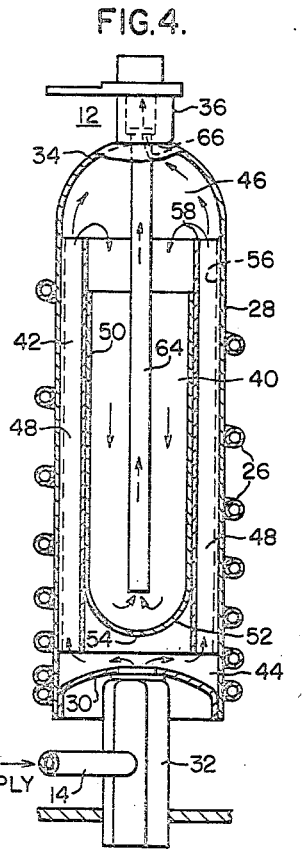
FIG. 4 is a partly-broken and sectioned view of the chamber of FIG. 3.

Referring to FIGURES 3 and 4, the chamber 12 includes an outer casing having a right cylindrical side wall 28, a bottom wall 30 having a central water inlet fitting 32, and a top wall 34 with a central water outlet fitting 36. The ratio of length to diameter of one satisfactory chamber is about 3 to 1. The interior of the chamber 12 is transversely separated into a central columnar space 40 and the radially outer annular space 42, for most of the height of the chamber. The bottom and top end spaces are designated 44 and 46 respectively. The transverse separation of spaces within the chamber is provided in part by the upwardly-open deep cup having a right cylindrical side wall 50, and a bottom end wall 52 with a central drain port 54. The outer annular space 42 is divided into a plurality of upright passages by extended surface heat exchange means 48 provided by a corrugated sheet formed into a circular sleeve to fit in the annular space. The outer periphery crests 56 of the sleeve contact the chamber side wall 28 while the inner periphery crests 58 contact the deep cup side wall 50.

The flow of water through the chamber 12 when the bubbler valve 16 is open is generally as indicated by the directional arrows of FIGURE 4. The water enters the lower end 44 of the chamber and is constrained to pass upwardly through the outer annular space 42 in heat exchanging relation with the heat exchange means 48 forming the upright passages. The water then passes from the chamber upper end 46 down into the cup and through the draw tube 64 to the outlet fitting 36. The draw tube upper end has a crease 66 or other equivalent means to serve as a bypass from the space 46 to the outlet fitting and bubbler (which may serve as one form of pressure relief means) to permit normal air elimination, and to provide a water expansion escape passage during chamber freezing. Additional details on the structure and cooling operation of the chamber may be found in the noted copending Scott and Ter Buch patent application.

The present invention of course is concerned with those aspects of the structure which permit the cooling chamber to be subjected to a solidly frozen condition in a manner which avoids structural damage to the chamber. To attain this end, the refrigerant coils 26 are wrapped about the chamber in a non-uniform spacing which concentrates the coils near the bottom end of the chamber and spaces them more widely near the top. As one example of refrigerant tube spacing providing satisfactory results, attention is directed to the left side of the chamber of FIGURES 3 and 4. The first and second tube loops are in contact adjacent the bottom end of the chamber. Then considering the spacing between the second and third tubes from the bottom as a space of one unit, the spacing between each successively higher loop is about 1¼ units. It is emphasized that this spacing arrangement is simply illustrative of one satisfactory arrangement and is not intended to suggest that the spacing must be uniformly progressive, or that the variations in spacing may not be provided in a series of steps with uniform spacing within each series.

Another characteristic of the preferred structure for the chamber is the domed bottom end wall 30. That is, the central portion of the wall is elevated relative to the periphery of the wall. This arrangement, in contrast with a bottom end wall having a depressed central area, limits the amount of water the lower coils must freeze if freezing occurs.

Some observations as to the factors entering into the freezing sequence are of interest and pertinent to the structure of this invention. First, it is not typical (although not new in itself) to provide the water inlet and outlet at the bottom and top, respectively, rather than in the reverse disposition. That is, water cooling chambers usually have top inlets and bottom outlets to permit withdrawal first of the cooler water normally found at the bottom of the chamber. This assumes of course that the temperature of all of the water is above 39° F., which is valid since most water coolers are designed to deliver water at about 50° F. Now, if the controls fail to stop the refrigeration system so that chilling of the water is not properly stopped, the portion of the water which first cools to below 39° F. expands and rises to the top level in the chamber. This reversal of the relation between water temperature and level at about 39° F. is well known. Thus with all the water in the chamber above approximately 39° F., successively lower levels of water are at successively lower temperatures, whereas with all of the water having temperatures below 39° but above 32° the order is reversed with successively lower levels of water being at successively higher temperatures. Accordingly, the general sequence of freezing of the water within the inventive chamber from the bottom to the top is opposed to the natural direction of freezing of the water. However, the construction according to the invention permits this contrary sequence of freezing to occur.

Figure 5:
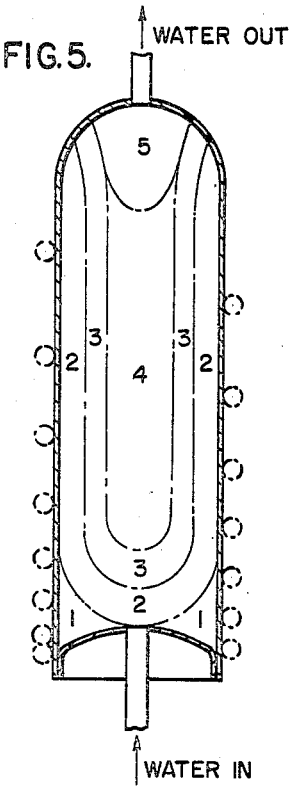
FIG. 5 is a diagrammatic view illustrating by numerical indication the sequence generally of freezing of water in a chamber according to the invention.

The general sequence of the freezing of the various portions of the water within the chamber with the structure according to the invention is indicated by the successive numerically designated portions of the chamber interior of FIGURE 5. Thus if the temperature control system fails and permits solid freezing to occur, the water in the portion designated 1 adjacent the lower peripheral corners of the chamber freezes first. In succession, the general progression of freezing is indicated by those portions designated 2–5 with the freezing progressing inwardly from the walls toward the center, and also progressing upwardly toward the top outlet. The last portion to freeze is that portion adjacent the outlet 36 and thus the desired result of avoiding bridging of the outlet until all of the other water is frozen is attained.

It will be appreciated that the specific configuration of any given chamber and arrangement of the heat extracting coils, embodying the invention takes into consideration the factors of the heat extracting capacity of the coils relative to the ratio of length to diameter of the chamber, and the differences in thermal conductivity of chamber material, water, and ice. It is believed however that resultant satisfactory constructions are most practically attained empirically.

With the illustrated presently preferred construction, which includes the draw tube 64 with bypass 66, water and any accumulated air escape to the outlet through the bypass as the freezing progresses upwardly and expansion room is required. However, it is to be understood that the draw tube and bypass may be omitted and the proper freezing sequence may as readily occur.

I claim:

1. A water cooling chamber arrangement for a drinking water cooler, including:
    an enclosed unitary storage chamber having a generally upright disposition with a water inlet end in the bottom end portion of said chamber and a water outlet end in the top end portion of said chamber; and
    means for extracting heat from said chamber at a sufficiently greater rate adjacent said inlet end than the rate at locations successively closer to said outlet end to ensure that with a no-flow condition and water freezing temperatures in said chamber, freezing bridging across said chamber progresses generally from the inlet end to the outlet end within said chamber.

2. A cooling chamber according to claim 1, wherein:
    said heat extracting means comprises refrigerant coils wrapped about said chamber in an arrangement in which the coils adjacent the inlet end of said chamber are more closely spaced than those successively closer to said outlet end of said chamber.

3. In a cooling chamber arrangement according to claim 2:
    said inlet end comprises a member providing a centrally raised wall at the bottom of the chamber.

4. In a cooling chamber arrangement according to claim 3:
    said outlet end is in the form of a dome with the closest said refrigerant coil spaced substantially farther from the apex than the said refrigerant coil closest to said inlet end.

5. A water cooling chamber arrangement for a drinking water cooler, including:
    an enclosed unitary chamber having a generally upright upright disposition with a water inlet end in the bottom end portion of said chamber and a water outlet end in the top end portion of said chamber.
    means for relieving a pressure build-up in said chamber at said outlet end; and
    means for extracting heat from said chamber from one end to the other at differing rates along the length thereof, said heat extracting means being arranged to extract heat at the fastest rate adjacent the end opposite said relief means and at successively slower rates at locations successively closer to said relief means end to ensure that with a no-flow condition and water freezing temperatures in said chamber, freezing bridging across said chamber progresses generally from said end opposite said relief means toward said relief means end.

(References on following page)

References Cited

UNITED STATES PATENTS

| | | | |
|---|---|---|---|
| 3,170,307 | 2/1965 | Best | 62—399 X |
| 1,751,697 | 3/1930 | Hull | 165—146 |
| 2,186,900 | 1/1940 | Dick et al. | 62—395 |
| 2,526,526 | 10/1950 | Yuza | 62—394 X |
| 3,333,438 | 8/1967 | Benua et al. | 62—399 X |

FOREIGN PATENTS 522,305  6/1940  Great Britain.

ROBERT A. O'LEARY, Primary Examiner

ALBERT W. DAVIS, Assistant Examiner

U.S. Cl. X.R.

62—399, 516; 165—146, 155, 169